(12) United States Patent
Liu

(10) Patent No.: US 6,912,079 B2
(45) Date of Patent: Jun. 28, 2005

(54) METHOD AND APPARATUS FOR PHASE SHIFTING AN OPTICAL BEAM IN AN OPTICAL DEVICE

(75) Inventor: Ansheng Liu, Cupertino, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 10/367,085

(22) Filed: Feb. 14, 2003

(65) Prior Publication Data

US 2004/0160658 A1 Aug. 19, 2004

(51) Int. Cl.$^7$ .............................. G02F 1/01; G02F 1/07
(52) U.S. Cl. .................. 359/279; 359/245; 359/248
(58) Field of Search ............................ 359/279, 245, 359/240, 237, 248, 246, 238; 385/123, 8, 131; 257/14, 96, 98

(56) References Cited

U.S. PATENT DOCUMENTS

| | | | | | |
|---|---|---|---|---|---|
| 5,311,592 | A | * | 5/1994 | Udd | 380/256 |
| 5,339,370 | A | * | 8/1994 | Sano et al. | 385/2 |
| 5,535,045 | A | * | 7/1996 | Dutta et al. | 359/248 |
| 6,522,462 | B2 | * | 2/2003 | Chu et al. | 359/344 |
| 6,611,539 | B2 | * | 8/2003 | Ledentsov et al. | 372/20 |
| 6,636,678 | B1 | * | 10/2003 | Bendett et al. | 385/132 |
| 6,683,899 | B2 | * | 1/2004 | Murayama | 372/46 |
| 2002/0131162 | A1 | * | 9/2002 | Beeson | 359/342 |

OTHER PUBLICATIONS

Ibrahim, Tarek A. et al., "All-Optical Switching in a Laterally Coupled Microring Resonator by Carrier Injection", *IEEE Photonics Technology Letters*, vol. 15, No. 1 (Jan. 2003).

* cited by examiner

*Primary Examiner*—Timothy Thompson
(74) *Attorney, Agent, or Firm*—Blakely, Sokoloff, Taylor & Zafman LLP

(57) ABSTRACT

An apparatus and method for modulating a phase of optical beam. In one embodiment, an apparatus according to embodiments of the present invention includes a first region of semiconductor material having a first polarity. The apparatus further includes a second region of semiconductor material having a second polarity. The second region is disposed proximate to the first region such that an interface between the first and second regions defines interdigitated regions of the first and second regions of semiconductor material. The first and second regions are adapted to be reversed biased in response to a signal to modulate a depletion region in response to the signal at the interface between the first and second region. Accordingly, an optical beam directed through the interface between the first and second regions through the modulated depletion region is adapted to be phase shifted in response to the signal.

49 Claims, 6 Drawing Sheets

METHOD AND APPARATUS FOR PHASE SHIFTING AN OPTICAL BEAM IN AN OPTICAL DEVICE

BACKGROUND OF THE INVENTION

1. Field of the Invention

The present invention relates generally to optics and, more specifically, the present invention relates to modulating optical beams.

2. Background Information

The need for fast and efficient optical-based technologies is increasing as Internet data traffic growth rate is overtaking voice traffic pushing the need for optical communications. Transmission of multiple optical channels over the same fiber in the dense wavelength-division multiplexing (DWDM) systems and Gigabit (GB) Ethernet systems provide a simple way to use the unprecedented capacity (signal bandwidth) offered by fiber optics. Commonly used optical components in the system include wavelength division multiplexed (WDM) transmitters and receivers, optical filter such as diffraction gratings, thin-film filters, fiber Bragg gratings, arrayed-waveguide gratings, optical add/drop multiplexers, lasers and optical switches. Optical switches may be used to modulate optical beams. Two commonly found types of optical switches are mechanical switching devices and electro-optic switching devices.

Mechanical switching devices generally involve physical components that are placed in the optical paths between optical fibers. These components are moved to cause switching action. Micro-electronic mechanical systems (MEMS) have recently been used for miniature mechanical switches. MEMS are popular because they are silicon based and are processed using somewhat conventional silicon processing technologies. However, since MEMS technology generally relies upon the actual mechanical movement of physical parts or components, MEMS are generally limited to slower speed optical applications, such as for example applications having response times on the order of milliseconds.

In electro-optic switching devices, voltages are applied to selected parts of a device to create electric fields within the device. The electric fields change the optical properties of selected materials within the device and the electro-optic effect results in switching action. Electro-optic devices typically utilize electro-optical materials that combine optical transparency with voltage-variable optical behavior. One typical type of single crystal electro-optical material used in electro-optic switching devices is lithium niobate ($LiNbO_3$).

Lithium niobate is a transparent material from ultraviolet to mid-infrared frequency range that exhibits electro-optic properties such as the Pockels effect. The Pockels effect is the optical phenomenon in which the refractive index of a medium, such as lithium niobate, varies with an applied electric field. The varied refractive index of the lithium niobate may be used to provide switching. The applied electrical field is provided to present day electro-optical switches by external control circuitry.

Although the switching speeds of these types of devices are very fast, for example on the order of nanoseconds, one disadvantage with present day electro-optic switching devices is that these devices generally require relatively high voltages in order to switch optical beams. Consequently, the external circuits utilized to control present day electro-optical switches are usually specially fabricated to generate the high voltages and suffer from large amounts of power consumption. In addition, integration of these external high voltage control circuits with present day electro-optical switches is becoming an increasingly challenging task as device dimensions continue to scale down and circuit densities continue to increase.

BRIEF DESCRIPTION OF THE DRAWINGS

The present invention is illustrated by way of example and not limitation in the accompanying figures.

DETAILED DESCRIPTION

Figure 1:
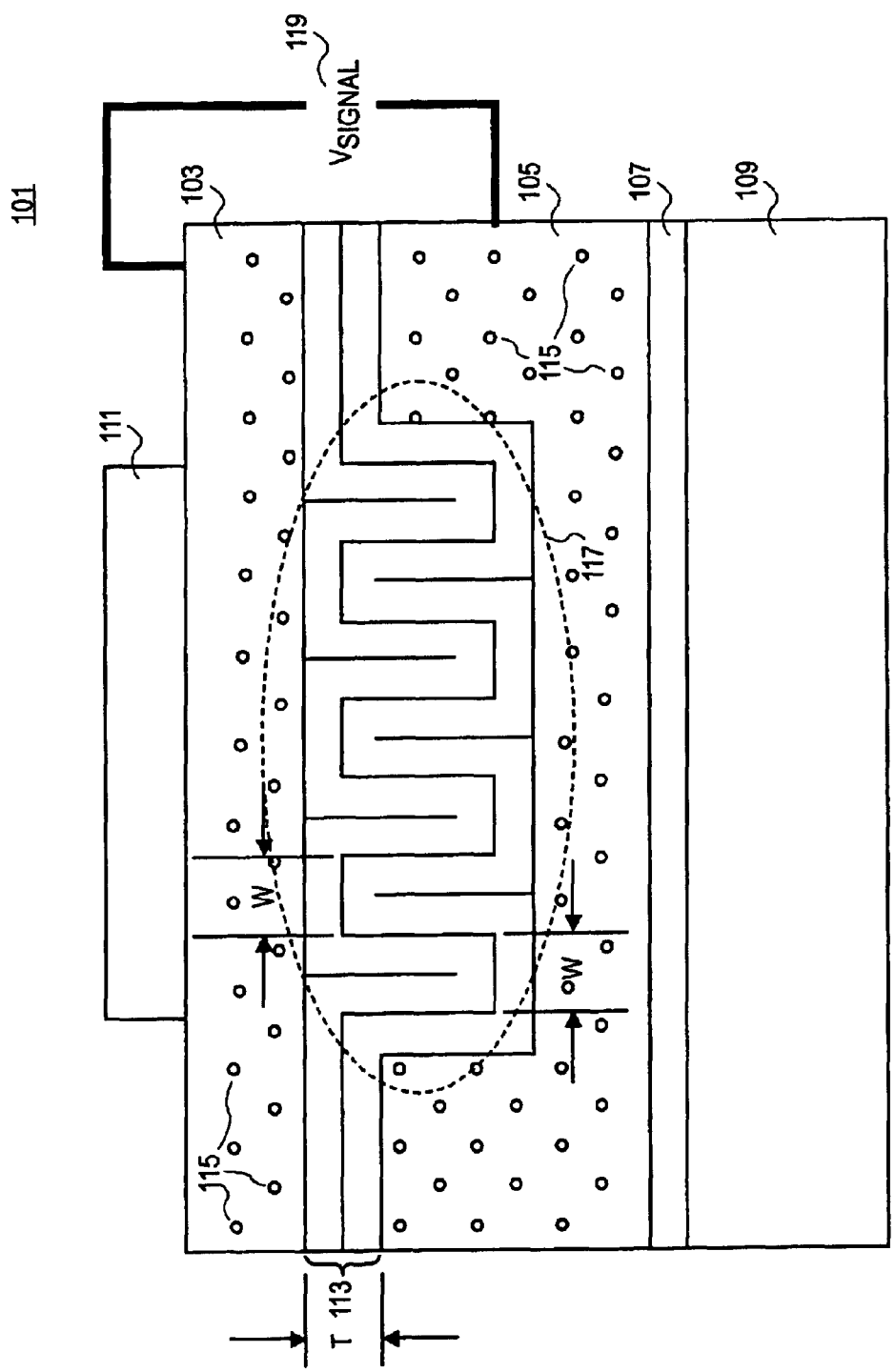
FIG. 1 is a cross-section illustration of one embodiment of an optical device including interdigitated regions of semiconductor material in accordance with the teachings of the present invention.

Methods and apparatuses for phase shifting, switching and modulating an optical beam with an optical device are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. In addition, it is appreciated that the figures provided herewith are for explanation purposes to persons ordinarily skilled in the art and that the drawings are not necessarily drawn to scale.

In one embodiment of the present invention, a semiconductor-based optical device is provided in a fully integrated solution on a single integrated circuit chip. One embodiment of the presently described optical device includes a semiconductor-based waveguide having pn junction structure adapted to be reversed biased in response to a signal to modulate a depletion region. In one embodiment, the p-n junction structure includes interdigitated regions of the p regions and n regions of semiconductor material. With interdigitated regions, the overall cross-sectional area of the depletion region is increased resulting in improved effective index modulation. An optical path is directed through the depletion region at the interdigitated regions, which results in phase shifting of an optical beam directed through the optical path in response to the depletion region.

In another embodiment, an optical phase shifter is realized in accordance with the teachings of the present invention with a p-i-n structure disposed in semiconductor material through which an optical beam is directed through an optical waveguide. In one embodiment, the p and n regions of the p-i-n structure are adapted to be reverse biased and the intrinsic semiconductor region of the p-i-n structure is adapted to be illuminated with an optical pump signal beam. The optical pump signal beam photo generates free charge carriers in the intrinsic semiconductor region, which phase shift the optical beam. The reversed biased p and n regions of the p-i-n structure are adapted to reduce the carrier lifetimes of the photo generated free charge carriers once they are generated. Embodiments of the disclosed optical switches can be used in a variety of high bandwidth applications including multi-processor, telecommunications, networking or the like. Embodiments of the optical phase shifters can be employed in a variety of high speed optical applications including optical delay lines, switches, modulators, add/drops, or the like.

To illustrate, FIG. 1 is a cross-section illustrating generally one embodiment of an optical device including interdigitated regions of semiconductor material in accordance with the teachings of the present invention. As shown in FIG. 1, optical device 101 includes a first region of semiconductor material 103 and a second region of semiconductor material 105. In one embodiment, semiconductor material 103 includes SiGe with p-type dopants and semiconductor material 105 includes Si and n-type dopants. As illustrated in FIG. 1, one embodiment of optical device 101 is fabricated on a silicon on insulator (SOI) wafer and therefore includes a buried insulating layer 107 and a layer of semiconductor material 109. In one embodiment, a region 111 of $Si_3N_4$ is disposed proximate to semiconductor region 103, as shown in FIG. 1.

In one embodiment, an optical waveguide is included in optical device 101, through which an optical beam 117 is directed. In one embodiment, optical beam 117 includes infrared or near infrared light. For example, in one embodiment, optical beam 117 has a wavelength near approximately 1.3 $\mu$m or 1.55 $\mu$m. In the embodiment illustrated in FIG. 1, the optical path along which optical beam 117 is directed is along an axis that parallel to the axis of the optical waveguide of optical device 101. In the example shown in FIG. 1, the optical path and therefore optical beam 117 are shown to propagate along a direction going through, or coming in and out of, the page.

As shown in FIG. 1 the optical mode of optical beam 117 is illustrated passing through the interdigitated regions of semiconductor material 103 and 105. In the illustrated embodiment, buried insulating layer 107 and region 111 of $Si_3N_4$ act as cladding for the waveguide in optical device 101 and help to provide vertical confinement for optical beam 117 to remain within the waveguide. In one embodiment, semiconductor material 103 includes SiGe and semiconductor material 105 includes Si such that the refractive index of semiconductor material 103 is slightly greater than the refractive index of semiconductor material 105. As a result, the interdigitated regions of semiconductor material 103 and 105 help to provide horizontal lateral confinement for optical beam 117 to remain within the waveguide in optical device 101.

According to embodiments of the present invention, optical device 101 is adapted to be reversed biased selectively in response to a signal $V_{SIGNAL}$ 119 applied across semiconductor regions 103 and 105. The reverse bias induces carrier depletion at the interface between the semiconductor materials 103 and 105. This carrier depletion induced by the reverse bias is illustrated as the modulated depletion region 113 in FIG. 1. As shown in the depicted embodiment, depletion region has a thickness T at the interface between the semiconductor materials 103 and 105. FIG. 1 also illustrates that the width of the interdigitated regions of semiconductor material 103 and 105 is W. In one embodiment, the relationship between the thickness T of the modulated depletion region 113 and the width W of the interdigitated regions of semiconductor material 103 and 105 is:

$$T \geq W \qquad \text{(Equation 1)}$$

In one embodiment, the values for T and W may be adjusted based on the doping concentrations and voltages used. For example, in one embodiment, the doping concentrations may be for example 2–3=$10^{17}$ cm$^{-3}$, the voltages may be on the order of 5–10 volts and the widths for T and W are approximately 0.3 $\mu$m.

As a result, the concentration of charge carriers 115 in the interdigitated regions of semiconductor materials 103 and 105 approaches zero when modulated depletion region 113 is induced in response to $V_{SIGNAL}$ 119. The applied voltage induced change in the carrier density in the interdigitated regions results in a change in the refractive index of Si and SiGe due to plasma optical effects. Therefore, the effective index modulation efficiency is enhanced in accordance with the teachings of the present invention because the total carrier density change area at the interface between semiconductor materials 103 and 105 is greater in comparison than known techniques.

In one embodiment, the free charge carriers 115 may include for example electrons, holes or a combination thereof. In one embodiment, the free charge carriers 115 may attenuate optical beam 117 when passing through. In particular, the free charge carriers 115 may attenuate optical beam 117 by converting some of the energy of optical beam 117 into free charge carrier energy. Accordingly, the absence or presence of free charge carriers 115 in response to in response to $V_{SIGNAL}$ 119 at the interdigitated regions of semiconductor materials 103 and 105 will modulate optical beam 117 in accordance with the teachings of the present invention.

In one embodiment, the phase of optical beam 117 that passes through modulated depletion region 113 is modulated in response to $V_{SIGNAL}$ 119. In one embodiment, the phase of optical beam 113 passing through free charge carriers 115, or the absence of free charge carriers 115, in the waveguide of optical device 101 is modulated due to the plasma optical effect. The plasma optical effect arises due to an interaction between the optical electric field vector and free charge carriers 115 that may be present along the optical path of the optical beam 117 in optical device 101. The electric field of the optical beam 117 polarizes the free charge carriers 115 and this effectively perturbs the local dielectric constant of the medium. This in turn leads to a perturbation of the propagation velocity of the optical wave and hence the index of refraction for the light, since the index of refraction is simply the ratio of the speed of the light in vacuum to that in the medium. Therefore, the index of refraction in the waveguide of optical device 101 is modulated in response to the modulated depletion region 113. The modulated index of refraction in the waveguide of optical device 101 correspondingly modulates the phase of optical beam 117 propagating through the waveguide of optical device 101. In addition, the free charge carriers 115 are accelerated by the field and lead to absorption of the optical field as optical energy is used up. Generally the refractive index perturbation is a complex number with the real part being that part which causes the velocity change and the imaginary part being related to the free charge carrier absorption. The amount of phase shift $\phi$ is given by $$\phi = (2\pi/\lambda)\Delta nL \qquad \text{(Equation 2)}$$

with the optical wavelength $\lambda$, the refractive index change $\Delta n$ and the interaction length L. In the case of the plasma optical effect in silicon, the refractive index change $\Delta n$ due to the electron ($\Delta N_e$) and hole ($\Delta N_h$) concentration change is given by:

$$\Delta n = -\frac{e^2 \lambda^2}{8\pi^2 c^2 \varepsilon_0 n_0}\left(\frac{b_e (\Delta N_e)^{1.05}}{m_e^*} + \frac{b_h (\Delta N_h)^{0.8}}{m_h^*}\right) \qquad \text{(Equation 3)}$$

where $n_o$ is the nominal index of refraction for silicon, e is the electronic charge, c is the speed of light, $\epsilon_0$ is the permittivity of free space, $m_e^*$ and $m_h^*$ are the electron and hole effective masses, respectively, $b_e$ and $b_h$ are fitting parameters.

Figure 2:
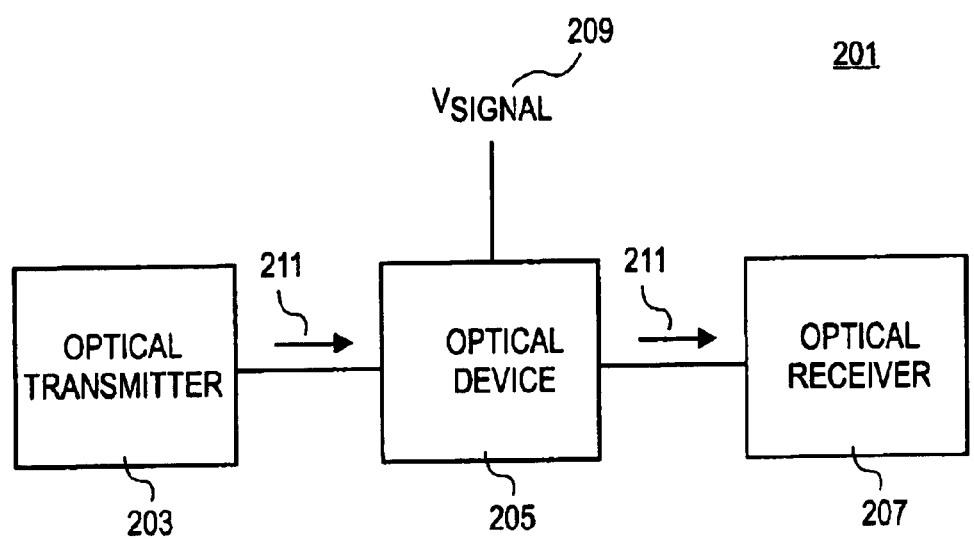
FIG. 2 is a block diagram illustration of one embodiment of a system including an optical transmitter and an optical receiver with an optical device according to embodiments of the present invention.

FIG. 2 illustrates generally a block diagram of one embodiment of a system including an optical transmitter and an optical receiver with an optical device according to embodiments of the present invention. In particular, FIG. 2 shows optical system 201 including an optical transmitter 203 and an optical receiver 207. In one embodiment, optical system 201 also includes an optical device 205 optically coupled between optical transmitter 203 and optical receiver 207. As shown in FIG. 2, optical transmitter 203 transmits an optical beam 211 that is received by optical device 205. In one embodiment, optical device 205 may include for example a device such as optical device 101 from FIG. 1 to phase shift optical beam 211 in response to signal $V_{SIGNAL}$ 209. In such an embodiment, optical device 205 may serve as an optical delay. In another embodiment, optical device 205 may include a device such as optical device 101 employed in an optical switch, an optical modulator or the like.

Figure 3:
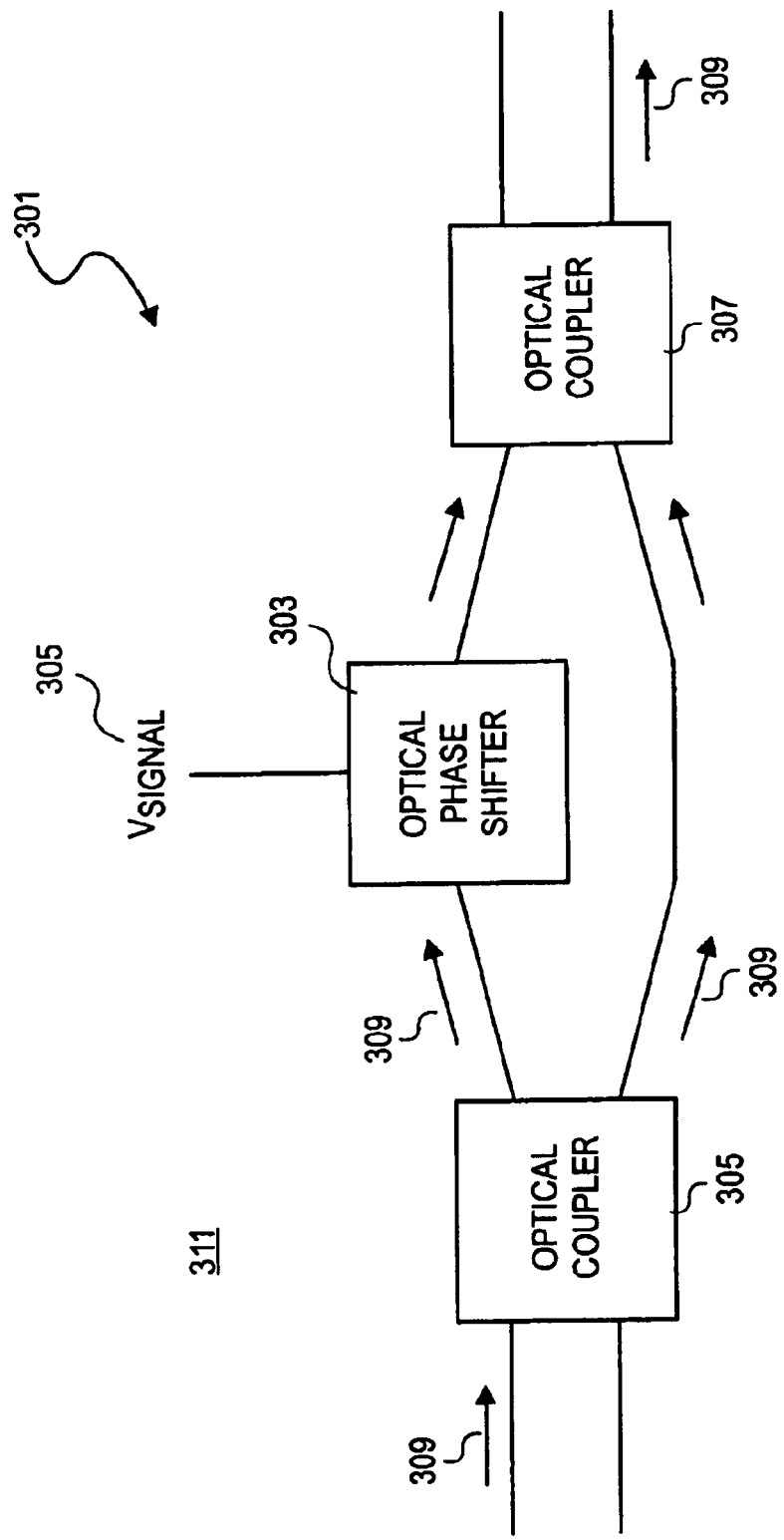
FIG. 3 is a block diagram illustration of one embodiment of an optical switch including an optical phase shifter according to embodiments of the present invention.

For example, in one embodiment of the present invention, a semiconductor-based optical switching device may be provided in a fully integrated solution on a single integrated circuit chip. In one embodiment, a 2×2 optical switch is realized with cascaded optical couplers with a phase shifter optically coupled in between. To illustrate, FIG. 3 shows generally one embodiment of an optical switch 301 that can be employed for optical device 205 of FIG. 2. As shown in the depicted embodiment, optical switch 301 includes an optical phase shifter 303 optically coupled between cascaded optical couplers 305 and 307. In one embodiment, optical phase shifter 303 is similar to optical device 101 of FIG. 1.

In one embodiment, optical couplers 305 and 307 may be realized with multi-mode interference devices (MMI) or other suitable optical coupling devices such as for example 3-dB evanescent waveguide couplers or the like to split an input optical beam. In one embodiment, optical couplers 305 and 307 are disposed the same semiconductor material 311 and optical phase shifter 303. In one embodiment, semiconductor material 311 comprises silicon or the like. As shown, each of the optical couplers 305 and 307 has two inputs and two outputs. It is appreciated that although the terms "input" and "output" have been used herein for explanation purposes to describe optical couplers 305 and 307. Optical beams directed through the optical couplers may therefore propagate in the reverse direction or in both directions.

In one embodiment, one of the inputs of optical coupler 305 is optically coupled to receive an optical beam 309 through an input waveguide disposed in semiconductor material 311. Optical beam 309 is split and is output from each of the outputs of optical coupler 305. One of the split optical beams of optical beam 309 is directed through optical phase shifter 303 before it is directed into one of the inputs of optical coupler 307. The other one of the split optical beams of optical beam 309 is directed into the other one of the inputs of optical coupler 307.

In operation, optical phase shifter 303 is used to selectively adjust the relative phase difference between the two split beams of optical beam 309. In particular, optical phase shifter may be used to control the relative phase difference to be either substantially 0 or $\pi$ in response to $V_{SIGNAL}$ 305. As a result of the selectable phase difference between the split optical beams of optical beam 309, optical beam 309 may selectively be output from one or the other output of optical coupler 307. In the embodiment depicted in FIG. 3, optical beam 309 is illustrated to be output from the "bottom" output. Optical beam 309 may alternatively be output from the "top" output of optical coupler 307 based on the relative phase difference resulting from $V_{SIGNAL}$ 305 in accordance with the teachings of the present invention. Accordingly, first and second optical receivers (not shown) may be optically coupled to the two outputs of optical coupler 307 and either one of the first and second optical receivers may be selected to receive optical beam 309 in response to $V_{SIGNAL}$ 305 in accordance with the teachings of the present invention.

Figure 4:
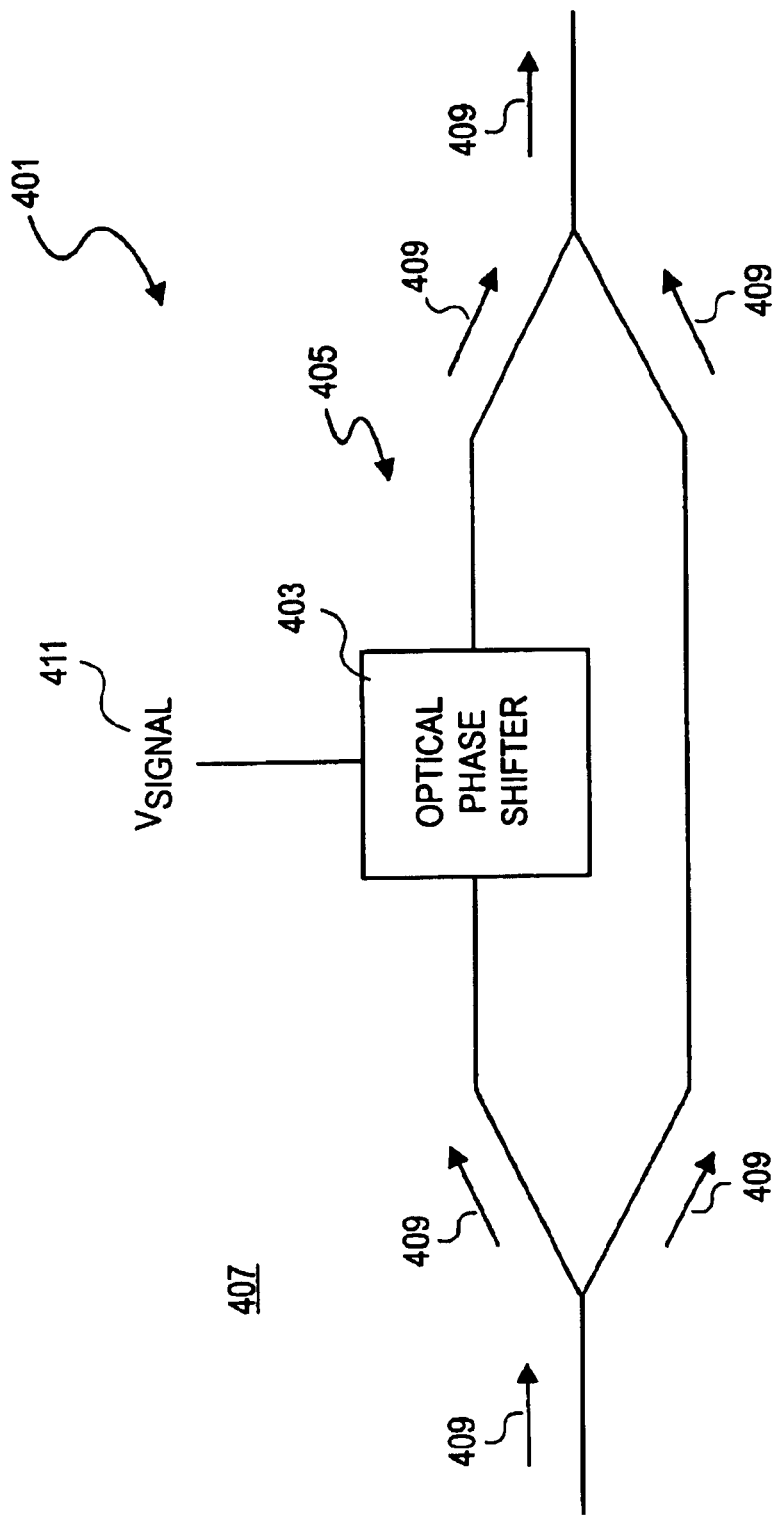
FIG. 4 is a block diagram illustration of one embodiment of an optical modulator including a Mach Zehnder Interferometer (MZI) configuration having one embodiment of an optical phase shifter according to embodiments of the present invention.

FIG. 4 illustrates generally one embodiment of an optical modulator 401 that can be employed in place optical device 205 of FIG. 2. As shown in the depicted embodiment, optical modulator 401 includes an optical phase shifter 403 in one of the two arms optically coupled between cascaded Y-branch couplers of a Mach-Zehnder Interferometer (MZI) configuration 405 disposed in semiconductor material 407. In one embodiment, optical phase shifter 403 is similar to optical device 101 of FIG. 1.

In operation, an optical beam 409 is directed into an input of MZI configuration 405. Optical beam 409 is split such that a first portion of the optical beam 409 is directed through one of the arms of the MZI configuration 405 and a second portion of optical beam 409 is directed through the other one of the arms of the MZI configuration 405. As shown in the depicted embodiment, one of the arms of the MZI configuration 405 includes optical phase shifter 403, which adjusts a relative phase difference between the first and second portions of optical beam 409 in response to signal $V_{SIGNAL}$ 411. In one embodiment, the first and second portions of optical beam 409 are then merged in semiconductor substrate 407 such that optical beam 409 is modulated at the output of MZI configuration 405 as a result of constructive or destructive interference. In one embodiment, as shown, one of the arms of the MZI configuration 405 includes an optical phase shifter 403. In another embodiment, both of the arms of the MZI configuration 405 may include an optical phase shifter 403.

Figure 5:
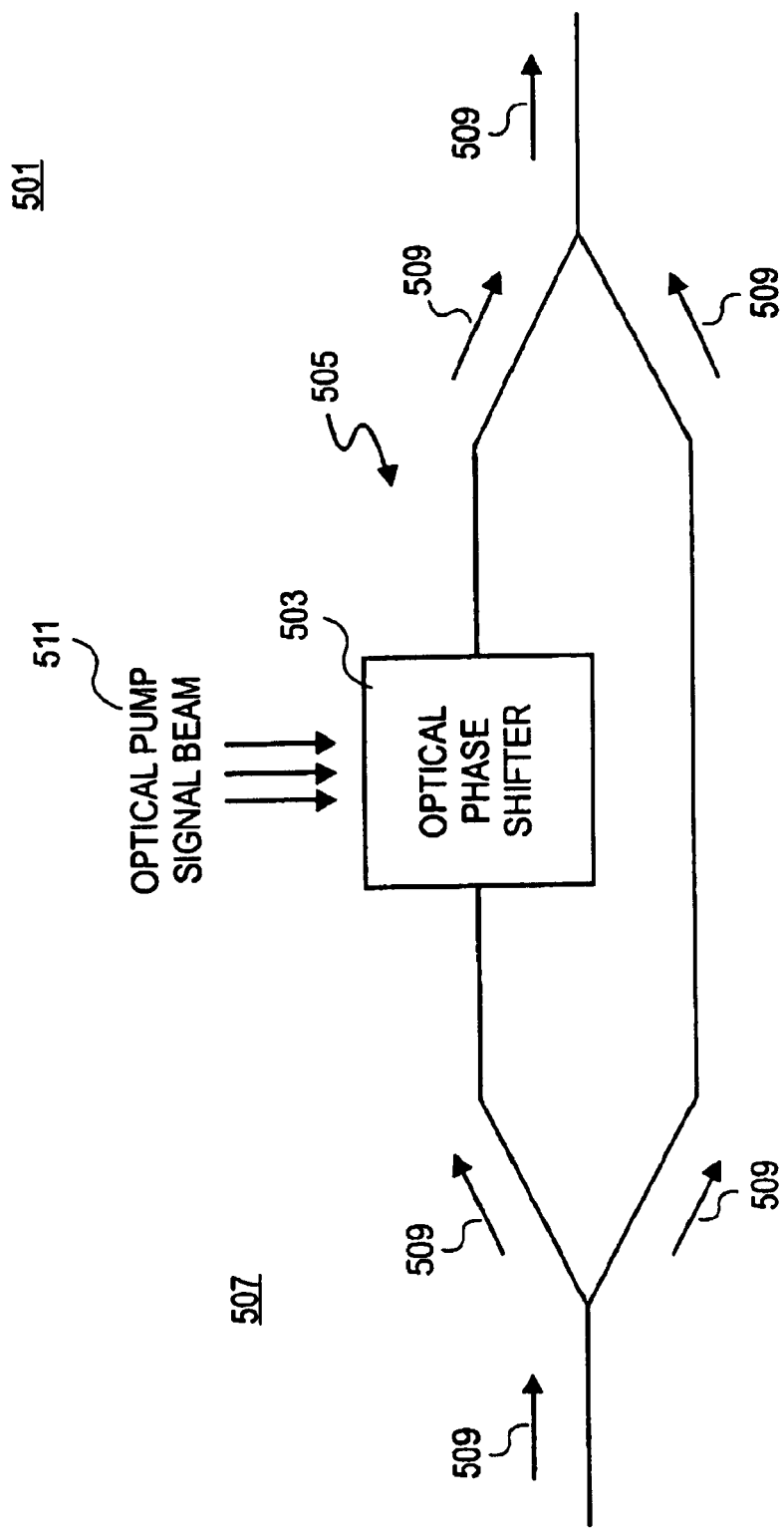
FIG. 5 is a block diagram illustration of another embodiment of an optical modulator including a Mach Zehnder Interferometer (MZI) configuration having another embodiment of an optical phase shifter according to embodiments of the present invention.

FIG. 5 illustrates generally another embodiment of an optical modulator 501 that can be employed in place optical device 205 of FIG. 2. As can be appreciated to a person having the benefit of this disclosure, optical modulator 501 shares similarities with optical modulator 401 of FIG. 4. In particular, an optical beam 509 is directed into an input of an MZI configuration 505 disposed in semiconductor material 507. Optical beam 509 is split such that a first portion of the optical beam 509 is directed through one of the arms of the MZI configuration 505 and a second portion of optical beam 509 is directed through the other one of the arms of the MZI configuration 505. As shown in the depicted embodiment, one of the arms of the MZI configuration 505 includes optical phase shifter 503. In one embodiment, the first and second portions of optical beam 509 are then merged in semiconductor substrate 507 such that optical beam 509 is modulated at the output of MZI configuration 505 as a result of constructive or destructive interference.

One difference between optical modulator 501 of FIG. 5 and optical modulator 401 of FIG. 4 is that an optical beam directed through optical modulator 501 is modulated in response to an optical pump signal beam 511 instead of a signal $V_{SIGNAL}$ 411. In one embodiment, optical pump signal beam is an optical beam produced by an optical pump source whereas $V_{SIGNAL}$ 411 is an electrical signal (e.g. voltage or current) produced by an electrical source.

Figure 6:
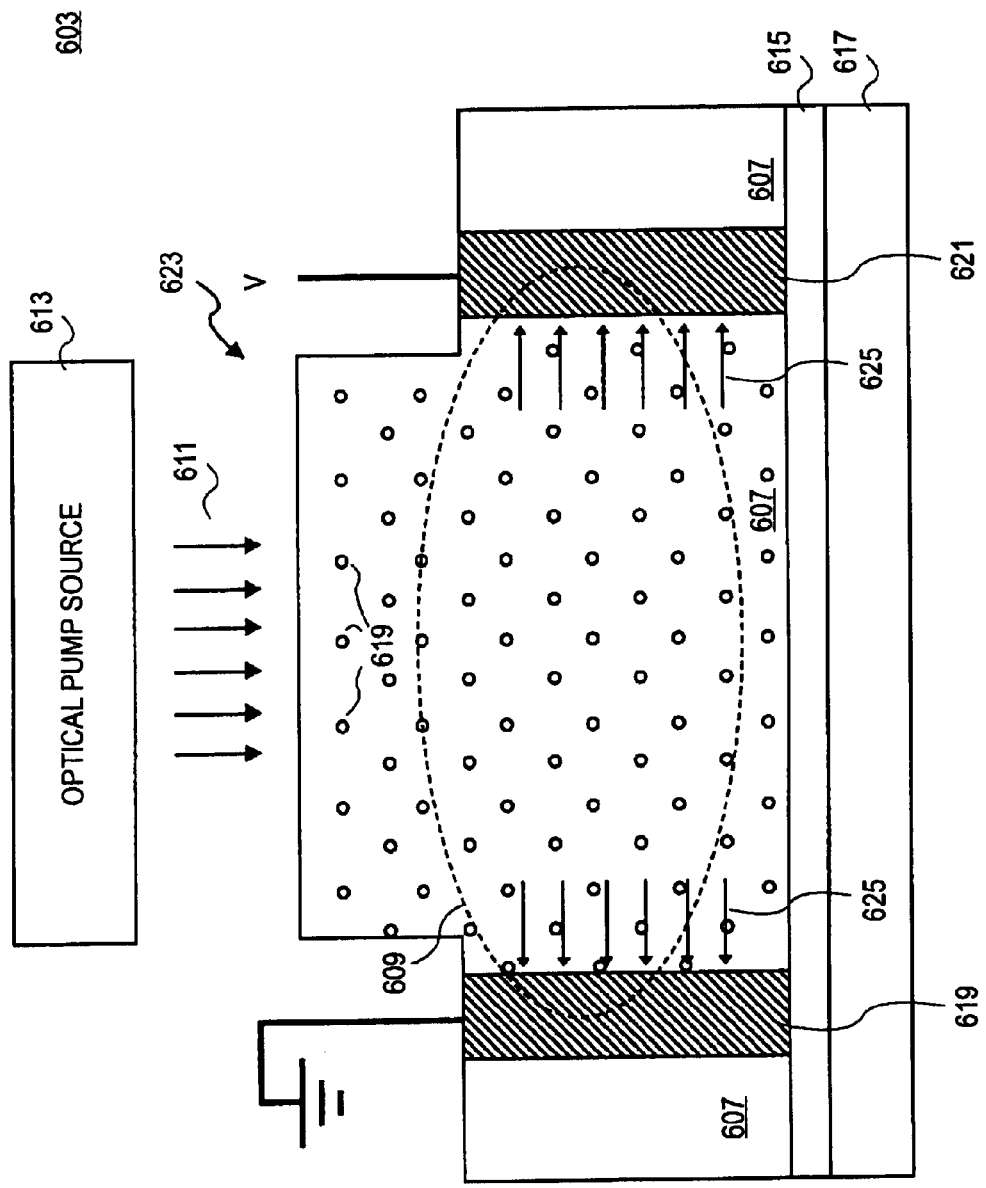
FIG. 6 is a cross-section illustration of another embodiment of an optical device including a p-i-n structure in accordance with the teachings of the present invention.

To illustrate, FIG. 6 shows generally a cross-section of one embodiment of an optical phase shifter 603 in accordance with the teachings of the present invention. It is appreciated that an embodiment of optical phase shifter 603 may be used in place of optical phase shifter 503 of FIG. 5, optical phase shifter 303 of FIG. 3, optical device 205 of FIG. 2 or the like. As shown, one embodiment of optical phase shifter 603 includes a p-i-n structure 623 disposed in semiconductor material 607. In the illustrated embodiment, p-i-n structure 623 is disposed in an SOI wafer, which includes a buried insulating layer 615 disposed between semiconductor material 607 and semiconductor material 617. In one embodiment, semiconductor material 607 is intrinsic semiconductor material, which in one embodiment includes for example silicon or the like.

As shown in FIG. 6, one embodiment of p-i-n structure 623 includes a pin diode waveguide with a p-type doped region 619 and an n-type doped region 621 disposed along the sides of the waveguide with intrinsic semiconductor material 607 disposed between. In the illustrated embodiment, the pin diode waveguide is a rib waveguide. In one embodiment, the height of the slab region of the rib waveguide is approximately 7 µm and the height of the rib region of the rib waveguide is approximately 3 µm such that the total height of the rib waveguide is approximately 10 µm.

As shown in the depicted embodiment, narrow and deep trenches are formed in semiconductor material 607 in which p-type doped region 619 and an n-type doped region 621 are disposed. In one embodiment, these trenches are also approximately 7 µm deep such that the p-type and n-type doped regions 619 and 621 extend down to the bottom of the rib waveguide. In one embodiment, p-type doped region 619 and an n-type doped region 621 include polysilicon. In one embodiment, the widths of these trenches in which p-type and n-type doped regions 619 and 621 are disposed is relatively narrow, such as for example 0.3 to 0.4 µm. Accordingly, the absorption of light by the polysilicon disposed in the p-type and n-type doped regions 619 and 621 is relatively small, which results in relatively little loss in an optical beam directed through the rib waveguide in accordance with the teachings of the present invention.

It is appreciated of course that these dimensions described above are of one embodiment provided for explanation purposes and that other dimensions may be utilized in accordance with the teachings of the present invention. Moreover, in another embodiment, the pin diode waveguide is not limited to being a rib waveguide and may any other type of suitable optical waveguide such as for example a slab waveguide or the like.

Referring back to the depicted embodiment of FIG. 6, the pin structure 623 is adapted to be reversed biased with p-type doped region 619 coupled to ground and n-type doped region 621 coupled to a voltage V. It is appreciated of course that the doping polarities can be modified or adjusted and that varying ranges of voltage values for V in accordance with the teachings of the present invention.

As shown in FIG. 6, the pin diode waveguide of optical phase shifter 603 includes an optical path along which an optical beam 609 is directed. In one embodiment, optical beam 609 includes infrared or near infrared light having wavelengths such as 1.3 µm or 1.55 µm or the like. It is appreciated that optical beam 609 may include other wavelengths in the electromagnetic spectrum in accordance with the teachings of the present invention. In the embodiment illustrated in FIG. 6, the optical path along which optical beam 609 is directed is along an axis that parallel to the axis of the pin diode waveguide of optical phase shifter 603. In the example shown in FIG. 6, the optical path and therefore optical beam 609 are shown to propagate along a direction going through, or coming in and out of, the page.

In the embodiment shown in FIG. 6, an optical pump source 613 is adapted to illuminate p-i-n structure 623 with an optical pump signal beam 611. In one embodiment, optical pump source 613 may be any suitable light source such as for example a laser such as a vertical cavity surface emitting laser (VCSEL) or the like. In one embodiment, optical pump source 613 may be integrated into the SOI wafer or chip or optical pump source 613 may be external to the SOI wafer or chip. In one embodiment, optical pump signal beam 611 may have a wavelength of approximately 850 nm or the like. It is appreciated of course that other wavelengths may be utilized in accordance with the teachings of the present invention.

In operation, the p-i-n structure 623 is adapted to absorb the pump signal beam 611 such that free charge carriers 619 are photo generated in the intrinsic semiconductor material 607 of p-i-n structure 623 in response thereto. In one embodiment, information encoded into a signal received by optical pump source 613 may be modulated into optical pump signal beam 611. As a result, free charge carriers 619 are therefore photo generated in intrinsic semiconductor material 607 in response to the signal. In one embodiment, this signal may for example be similar to $V_{SIGNAL}$ as described above in FIGS. 1–4. In one embodiment, since the height of the waveguide is approximately 10 µm as described above, the 850 nm light of optical pump signal beam 611 is almost completely absorbed within this 10 µm distance.

As illustrated in FIG. 6, a substantial portion of optical beam 609 is directed through the intrinsic semiconductor material 607 of p-i-n structure 623 in which free charge carriers 619 are photo generated in response to optical pump signal beam 611. As discussed above with respect to Equations 2 and 3 above, the photo generated free charge carriers 619 in the intrinsic semiconductor material 607 induce a refractive index change due to the plasma optical effect. As a result, the phase of optical beam 609 is phase shifted in response to optical pump signal beam 611 in accordance with the teachings of the present invention.

It is noted that the speed at which optical beam 609 can be phase shifted is affected at least in part by the carrier life times or transit times of free charge carriers 619 to p-type and n-type doped regions 619 and 621. As discussed above, p-i-n structure 623 is adapted in one embodiment to be reversed biased such that free charge carriers 619 are swept into to p-type and n-type doped regions 619 and 621 as shown with arrows 625 in FIG. 6. By reverse biasing p-i-n structure 623, the carrier life times or transit times of free charge carriers 619 to p-type and n-type doped regions 619 and 621 are reduced in accordance with the teachings of the present invention. By reducing the carrier life times or transit times of free charge carriers 619, the maximum speed at which optical beam 609 can be phase shifted is increased in accordance with the teachings of the present invention.

To illustrate, in one embodiment, the intrinsic semiconductor region 607 has a width of approximately 10 $\mu$m. Thus, at a saturation speed for free charge carriers 619 of approximately $1 \times 10^7$ cm/sec, the transit time of free charge carriers 619 to p-type and n-type doped regions 619 and 621 is approximately 50 ps. As a result, optical phase shifter 603 can be operated at a speed of at least 2.5 GHz in one embodiment. With a reduction in the distance between p-type and n-type doped regions 619 and 621, the speed can be further increased in accordance with the teachings of the present invention.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:
   a first region of semiconductor material having a first polarity; and
   a second region of semiconductor material having a second polarity, the second region disposed proximate to the first region such that an interface between the first and second regions defines interdigitated regions of the first and second regions of semiconductor material, the first and second regions adapted to be reversed biased in response to a signal to modulate a depletion region in response to the signal at the interface between the first and second regions such that an optical beam directed through the interface between the first and second regions through the modulated depletion region is adapted to be phase shifted in response to the signal.

2. The apparatus of claim 1 further comprising a buried insulating layer disposed proximate to the semiconductor material including the first and second regions such that the buried insulating layer is adapted to help confine the optical beam along an optical path in the semiconductor material.

3. The apparatus of claim 1 wherein an optical waveguide through which the optical beam is directed comprises the first and second regions of semiconductor material.

4. The apparatus of claim 1 wherein a width of the interdigitated regions of the first and second regions of semiconductor material is less than or equal to a thickness of the depletion region modulated in response to the signal.

5. The apparatus of claim 1 wherein the semiconductor material comprises silicon.

6. The apparatus of claim 5 wherein one of the first and second regions of semiconductor material comprises SiGe.

7. The apparatus of claim 5 comprising a layer of $Si_3N_4$ disposed proximate to the semiconductor material including the first and second regions such that the layer of $Si_3N_4$ is adapted to help confine the optical beam in the semiconductor material.

8. The apparatus of claim 1 wherein one of the first and second regions of semiconductor material comprises p-type dopants and the other one of the first and second regions of semiconductor material comprises n-type dopants.

9. The apparatus of claim 1 wherein one of the first and second regions of semiconductor material comprises material having a higher refractive index than the other of the first and second regions of semiconductor material such that the interdigitated regions of the first and second regions of semiconductor material are adapted to help confine the optical beam within the semiconductor material.

10. A method, comprising:
    directing an optical beam along an optical path through semiconductor material through an interface defined with interdigitated regions between first and second regions of the semiconductor material;
    applying a signal to the first and second regions of the semiconductor material to reverse bias the first and second regions to modulate at the interface between the first and second regions a depletion region in response to the signal; and
    phase shifting the optical beam in response to the signal.

11. The method of claim 10 further comprising confining the optical beam to remain along an optical path in the semiconductor material with a buried insulating layer disposed proximate to the semiconductor material.

12. The method of claim 10 further comprising modulating a thickness of the depletion region at the interface to a thickness of at least a width of the interdigitated regions of the first and second regions of semiconductor material.

13. The method of claim 10 further comprising confining the optical beam to remain along an optical path in the semiconductor material with a layer of $Si_3N_4$ disposed proximate to the semiconductor material.

14. The method of claim 10 wherein one of the first and second regions of semiconductor material comprises material having a higher refractive index than the other of the first and second regions of semiconductor material, the method further comprising confining the optical beam to remain along an optical path in the semiconductor material with the interdigitated regions of the first and second regions of semiconductor material.

15. A system, comprising:
    an optical transmitter to generate an optical beam;
    an optical receiver optically coupled to receive the optical beam;
    an optical device optically coupled between the optical transmitter and the optical receiver, the optical device including an optical phase shifter to modulate a phase of the optical beam, the optical phase shifter including:
    a first region of semiconductor material having a first polarity; and
    a second region of semiconductor material having a second polarity, the second region disposed proximate to the first region such that an interface between the first and second regions defines interdigitated regions of the first and second regions of semiconductor material, the first and second regions adapted to be reversed biased in response to a signal to modulate a depletion region in response to the signal at the interface between the first and second regions such that the optical beam is directed through the interface between the first and second regions through the modulated depletion region is adapted to be phase shifted in response to the signal.

16. The system of claim 15 wherein the optical device comprises an optical modulator including a Mach-Zehnder interferometer (MZI) configuration having first and second arms such that one of the first and second arms includes the optical phase shifter.

17. The system of claim 15 wherein the optical device comprises an optical switch including first and second 2×2 optical couplers coupled with first and second optical couplings, such that one of the first and second optical couplings between the first and second 2×2 optical couplers includes the optical phase shifter.

18. An apparatus, comprising:
a Mach-Zehnder interferometer (MZI) configuration having first and second arms coupled between first and second optical Y-branch couplers disposed in semiconductor material;
a p-i-n structure disposed in the semiconductor material in one of the first and second arms of the MZI configuration, the p-i-n structure adapted to be illuminated with an optical pump signal beam so as to photo generate free charge carrier to modulate a free charge carrier concentration in an intrinsic region of the p-i-n structure in response to the optical pump signal beam such that an optical beam directed through said one of the first and second arms is phase shifted relative to an optical beam directed through the other of the first and second arms in response to the optical pump signal beam so as to modulate an optical beam output from the MZI configuration in response to the optical pump signal beam.

19. The apparatus of claim 18 wherein p-i-n structure is coupled to be reversed biased to reduce a carrier lifetime of free charge carriers in the p-i-n structure.

20. The apparatus of claim 18 wherein the first and second arms of the MZI configuration comprise first and second waveguides disposed in the semiconductor material.

21. The apparatus of claim 20 wherein the first and second waveguides comprise rib waveguides disposed in the semiconductor material.

22. The apparatus of claim 18 wherein the p-i-n structure comprises p and n doped regions of semiconductor material disposed along respective sides of said one of the first and second arms of the MZI configuration.

23. The apparatus of claim 22 wherein the p and n doped regions of semiconductor material comprise polysilicon disposed in trenches formed in the semiconductor material along the respective sides of said one of the first and second arms of the MZI configuration.

24. The apparatus of claim 18 further comprising an optical pump source disposed on the semiconductor material, the optical pump source to generate the optical pump signal beam to illuminate the p-i-n structure.

25. The apparatus of claim 24 wherein the optical pump source comprises a vertical-cavity surface-emitting laser (VCSEL).

26. The apparatus of claim 18 further comprising an optical source optically coupled to an input of the MZI configuration.

27. The apparatus of claim 26 wherein the optical source comprises a continuous wave (CW) laser.

28. The apparatus of claim 18 wherein said p-i-n structure comprises a p-i-n diode disposed in the semiconductor material in said one of the first and second arms of the MZI configuration.

29. The apparatus of claim 18 wherein a wavelength of the optical pump signal beam is different that a wavelength of the optical beam output from the MZI configuration in response to the optical pump signal beam.

30. A method, comprising:
directing an optical beam into an input of a Mach-Zehnder Interferometer (MZI) configuration disposed in semiconductor material;
splitting the optical beam to be directed through first and second arms of the MZI configuration; and
selectively photo generating free charge carriers in one of the first and second arms of the MZI configuration to selectively phase shift a portion of the optical beam that is directed through said one of the first and second arms of the MZI configuration such that the optical beam is selectively modulated at an output of the MZI configuration in response to the photo generated free charge carriers.

31. The method of claim 30 wherein the optical beam is selectively modulated as a result of constructive and destructive interference at the output of the MZI configuration.

32. The method of claim 30 further comprising reducing a carrier life time of the photo generated free charge carriers by reverse biasing a p-i-n structure disposed in said one of the first and second arms of the MZI configuration.

33. The method of claim 30 wherein said selectively photo generating free charge carriers in one of the first and second arms of the MZI configuration comprises selectively illuminating a p-i-n structure disposed in said one of the first and second arms of the MZI configuration.

34. An apparatus, comprising:
an optical waveguide disposed in semiconductor material;
an intrinsic semiconductor region included in the semiconductor material through which the optical waveguide is disposed, wherein the intrinsic semiconductor region is adapted to be illuminated by an optical pump signal beam to photo generate free charge carriers in the optical waveguide to phase shift in response to the photo generated free charge carriers an optical beam to be directed through the optical waveguide;
p and n doped regions included in the semiconductor material disposed along sides of the optical waveguide proximate to the intrinsic semiconductor region, the p and n doped regions and the intrinsic semiconductor region adapted to provide a reverse-biased p-i-n structure through which the optical waveguide is directed.

35. The apparatus of claim 34 wherein the p-i-n structure is adapted to be reverse-biased to reduce a carrier lifetime of the photo generated free charge carriers.

36. The apparatus of claim 34 wherein the apparatus is included in one arm of a Ma h-Zehnder Interferometer (MZI) configuration disposed in the semiconductor material.

37. A method, comprising:
directing an optical beam through a waveguide disposed in semiconductor material;
photo generating free charge carriers in a p-i-n structure disposed in semiconductor material through which the optical waveguide is directed;
phase shifting the optical beam in response to the photo generated free charge carriers; and
reducing a carrier lifetime of the photo generated free charge carriers by reverse biasing the p-i-n structure.

38. The method of claim 37 wherein photo generating the free charge carriers in a p-i-n structure comprises illuminating the p-i-n structure with an optical pump signal beam.

39. The method of claim 37 further comprising splitting the optical beam with a Y splitter included in a Mach-Zehnder Interferometer (MZI configuration disposed in the semiconductor material, wherein the waveguide is one of two arms included in the MZI configuration.

40. The method of claim 37 further comprising selectively switching the optical beam in response to the photo generated free charge carriers, wherein the waveguide is one of two arms included between two optical couplers disposed in the semiconductor material.

41. A system, comprising:

an optical transmitter to generate an optical beam;

an optical receiver optically coupled to receive the optical beam;

an optical device optically coupled between the optical transmitter and the optical receiver, the optical device including an optical modulator to modulate an amplitude of the optical beam, the optical modulator including:

a Mach-Zehnder interferometer (MZI) configuration having first and second arms coupled between first and second optical Y-branch couplers disposed in semiconductor material, the MZI configuration having an input optically coupled to receive the optical beam from the optical transmitter;

a p-i-n structure disposed in the semiconductor material in one of the first and second arms of the MZI configuration, the p-i-n structure adapted to be illuminated with an optical pump signal beam so as to photo generate free charge carriers to modulate a free charge carrier concentration in an intrinsic region of the p-i-n structure in response to the optical pump signal beam such that a first portion of the optical beam directed through said one of the first and second arms is phase shifted relative to a second portion of the optical beam directed through the other of said first and second arms in response to the optical pump signal beam so as to modulate the amplitude of the optical beam output from the MZI configuration in response to the optical pump signal beam.

42. The system of claim 41 wherein p-i-n structure is coupled to be reversed biased to reduce a carrier lifetime of free charge carriers in the p-i-n structure.

43. The system of claim 41 wherein the first and second arms of the MZI configuration comprise first and second waveguides disposed in the semiconductor material.

44. The system of claim 41 wherein the p-i-n structure comprises p and n doped regions of semiconductor material disposed along respective sides of said one of the first and second arms of the MZI configuration.

45. The system of claim 44 wherein the p and n doped regions of semiconductor material comprise polysilicon disposed in trenches formed in the semiconductor material along the respective sides of said one of the first and second arms of the MZI configuration.

46. The system of claim 41 further comprising an optical pump source disposed on the semiconductor material, the optical pump source to generate the optical pump signal beam to illuminate the p-i-n structure.

47. The apparatus of claim 41 wherein the optical pump source comprises a vertical-cavity surface-emitting laser (VCSEL).

48. The system of claim 41 wherein said p-i-n structure comprises a p-i-n diode disposed in the semiconductor material in said one of the first and second arms of the MZI configuration.

49. The system of claim 41 wherein a wavelength of the optical pump signal beam is different that a wavelength of the optical beam output from the optical transmitter.

* * * * *

UNITED STATES PATENT AND TRADEMARK OFFICE
CERTIFICATE OF CORRECTION

PATENT NO. : 6,912,079 B2  
DATED : June 28, 2005  
INVENTOR(S) : Liu

It is certified that error appears in the above-identified patent and that said Letters Patent is hereby corrected as shown below:

<u>Column 4,</u>  
Line 26, delete "=" and insert -- x --.

<u>Column 12,</u>  
Line 48, delete "Ma h" and insert -- Mach --.

Signed and Sealed this

Sixth Day of September, 2005

JON W. DUDAS  
*Director of the United States Patent and Trademark Office*